May 17, 1938.  W. THAL  2,117,462
SYSTEM FOR MEASURING A COMPONENT OF AN ALTERNATING
CURRENT OR AN ALTERNATING VOLTAGE
Filed July 24, 1936
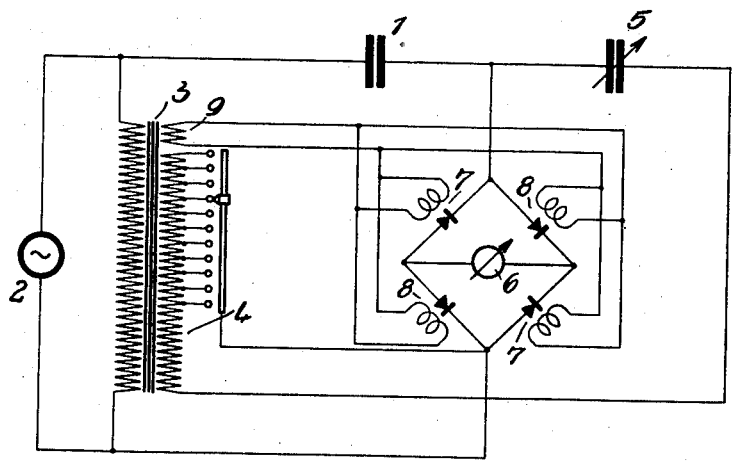
INVENTOR
WILHELM THAL
BY
ATTORNEYS.

Patented May 17, 1938

2,117,462

UNITED STATES PATENT OFFICE 2,117,462

SYSTEM FOR MEASURING A COMPONENT OF AN ALTERNATING CURRENT OR AN ALTERNATING VOLTAGE

Wilhelm Thal, Berlin-Siemensstadt, Germany, assignor to Siemens & Halske, Aktiengesellschaft, Siemensstadt, near Berlin, Germany, a corporation of Germany Application July 24, 1936, Serial No. 92,338
In Germany July 25, 1935

8 Claims. (Cl. 175—183)

My invention relates to a system for measuring a component of an alternating current or an alternating voltage, and more particularly to a system for measuring the loss angle of a condenser or the like.

In the art of testing electrical values the problem of determining a component of an alternating current or of an alternating voltage has recently become more and more important, particularly when testing the loss angle, to which an ever-increasing importance is being attached. Bridge connections are nowadays preferably employed for such testings, in the case of which the measuring instrument or a connection containing the measuring instrument forms the diagonal branch of the bridge. The aforesaid bridge connections are disadvantageous in that they require a relatively large amount of energy, since during the disturbance of the bridge balance only a very small portion of the total current flowing through the bridge also flows through the measuring instrument.

The disadvantage presented in the above bridge connections may be removed according to the invention by employing a particular auxiliary current or auxiliary voltage circuit in addition to a circuit in which the object to be tested is inserted. In this auxiliary voltage circuit is produced an alternating current or an alternating voltage, which is in synchronism with the component not to be measured of the current or of the voltage to be tested, but in phase opposition thereto. Furthermore, the auxiliary circuit comprises means for varying the magnitude of the current flowing therein or the value of the voltage. If now the circuit in which the object to be tested lies and the auxiliary current or auxiliary voltage circuit is connected to the measuring instrument in such a manner that the component not to be tested of the current or of the voltage to be measured may be compensated for by the auxiliary current or the auxiliary voltage, only the component to be tested then acts on the measuring instrument. Accordingly, the total current flowing through the object to be tested, for instance a capacity, may also be supplied to the measuring instrument so that the accuracy of the measurement is enhanced to a considerable extent as compared to the measurements attained by the usual bridge connections hitherto employed.

In the accompanying drawing is shown an embodiment of my invention in diagrammatic form.

It is assumed that, for instance, the loss angle of a condenser denoted by 1 is to be determined.

The voltage required for the test is taken from an alternating-current source 2. 3 denotes a transformer, from the secondary winding 4 of which variable voltages may be tapped within a relatively wide range. 5 is a reference condenser of variable capacity and as far as possible free of losses. 6 is a direct-current measuring instrument; 7 and 8 are separately excited rectifiers, which are energized by another secondary winding 9 of the transformer 3 and connected in Graetz-connection (bridge type rectifier arrangement) in series with the measuring instrument 6.

The testing circuit proper, in which the object to be tested lies, includes, aside from the object such as the capacity 1, also the measuring instrument 6 in series with the Graetz-rectifier-connection. The transformer 3 serves to energize the standard reference circuit, comprising the secondary winding 4 and the capacity 5 and having in common with the circuit, in which the object to be tested lies, the branch including the measuring instrument and the rectifier bridge. To explain the operation of the system according to the invention it will be perhaps preferable to consider that the condenser 1 to be tested is to be considered at first also free of losses. Assuming that the primary and secondary voltage in the transformer 3 are exactly 180° out of phase the following results: Through the capacity 1 flows a predetermined current into the rectifier bridge and the measuring instrument. The rectifiers which may be, for instance, of the vibrating reed type with separate excitation are so energized that there is a phase displacement of 180° between the rectifiers 7 and the rectifiers 8, which may be easily attained by poling the exciting windings of the rectifiers in a corresponding manner. The secondary winding of the transformer is so connected to the rectifier system as to counteract the primary voltage. Since in the auxiliary circuit also a capacity 5 free of losses is a determining factor as to the position of phase, also the two currents are exactly 180° out of phase. By tapping a corresponding auxiliary voltage from the secondary winding 4 the current in the auxiliary circuit may be adjusted to the same magnitude as the current flowing through the condenser 1. In this case, the measuring instrument 6 does not deflect. However, as soon as the object to be tested has a loss angle instead of freedom from losses the currents in both circuits are not any longer exactly 180° out of phase. Therefore, only the component of the current to be measured which is 180° out of phase with respect to the current in the auxiliary circuit may be compensated by the latter, so that a residual amount remains which causes the instrument to deflect and which represents the component corresponding to the loss angle of the condenser 1.

When carrying out the measurement it is not necessary to balance at first the connection with the aid of a condenser free of losses which replaces the object to be tested, but it suffices to vary the supply voltage of the auxiliary circuit or the capacity in the auxiliary circuit in such a manner that the instrument indicates the smallest deflection. In this case the component, 180° out of phase with respect to the current in the auxiliary circuit, is completely compensated for. The fluctuations of voltage of the energy source 2 cannot impair the test reading, since they influence both circuits uniformly. By the above-described connection a series of other problems besides the above mentioned may be solved; for instance, the connection may be employed for measuring the values of the capacitance, the inductance and the like. The connection is preferably employed in all such cases in which a predetermined component of an alternating voltage or of an alternating current is to be measured.

It is preferable to insert in the circuit a phase advancer between the secondary winding 9 of the transformer 3 and the exciting windings of the rectifiers 7 and 8 in the manner indicated in my copending application, Serial No. 93,239, filed July 29, 1936 in order that the connection may be employed for a variety of purposes, since it is not necessary in all cases that the voltage of the auxiliary circuit and the exciting voltage of the rectifiers be in phase, but certain phase displacements must be adjusted in other cases.

I claim as my invention:

1. In a system for measuring an alternating current property of an electric element by measuring a component of a testing current flowing through said element, an alternating current source, a testing circuit connected with said source and designed to include the element to be tested, a reference circuit coupled with said source, means for producing in said reference circuit a phase displacement of 180° against the current flowing in said testing circuit, a reference element of variable reactance in said reference circuit for balancing the reactance of said testing element, said testing circuit and said reference circuit having a common branch, a measuring instrument disposed in said common branch so as to be traversed by said testing current as well as by said reference current, and means for balancing the magnitudes of the component not to be measured of the testing current and of the corresponding component of said reference current, whereby the component not to be measured is compensated in magnitude and phase within said common branch containing said instrument and only the component to be measured is directly indicated by said instrument.

2. In a system for measuring an alternating current property of an electric element by measuring a component of a testing voltage connected with said element, an alternating current source, a testing circuit connected with said source and designed to include the element to be tested, a reference circuit coupled with said source, means for producing in said reference circuit a phase displacement of 180° against the voltage connected with said testing circuit, a reference element of variable reactance in said reference circuit for balancing the reactance of said testing element, said testing circuit and said reference circuit having a common branch, a measuring instrument disposed in said common branch so as to be connected to the voltages of said two circuits, and means for balancing the magnitudes of the component not to be measured of the testing voltage and of the corresponding component of said reference voltage, whereby the component not to be measured is compensated in magnitude and phase within said common branch containing said instrument and only the component to be measured is directly indicated by said instrument.

3. In a system for measuring a component of an alternating current, an alternating current source, a testing circuit connected with said source, a synchronous auxiliary source of alternating current in phase opposition to the component not to be measured of the current of said first-mentioned source, a reference circuit connected with said auxiliary source, means for balancing the component not to be measured of the current flowing in said reference circuit and the corresponding component of the current flowing in said testing circuit, said testing circuit and said reference circuit having a common branch, a rectifier arrangement of the bridge type connected in said common branch, a direct current measuring instrument connected in the bridge of said rectifier arrangement, the rectifiers of said arrangement consisting of separately actuated commutators, means for actuating said rectifiers synchronously with the aforesaid currents and in two timely succeeding groups of 180° phase displacement against each other, the rectifiers within each of said two successively actuated groups being designed to simultaneously close the connection of said instrument with said common branch, whereby said instrument indicates the component to be measured.

4. In a system for measuring a component of an alternating voltage, an alternating voltage source, a testing circuit connected with said source, a synchronous auxiliary source of alternating voltage in phase opposition to the component not to be measured of the voltage of said first-mentioned source, a reference circuit connected with said auxiliary source, means for balancing the component not to be measured of the voltage of said reference circuit and the corresponding component of the voltage of said testing circuit, said testing circuit and said reference circuit having a common branch, a rectifier arrangement of the bridge type connected in said common branch, a direct current measuring instrument connected in the bridge of said rectifier arrangement, the rectifiers of said arrangement consisting of separately actuated commutators, means for actuating said rectifiers synchronously with the aforesaid voltages and in two timely succeeding groups of 180° phase displacement against each other, the rectifiers within each of said two successively actuated groups being designed to simultaneously close the connection of said instrument with said common branch, whereby said instrument indicates the component to be measured.

5. In a system for measuring the loss angle of a condenser, an alternating current source, a testing circuit connected with said source and designed to include the condenser to be tested, a synchronous auxiliary source of alternating current, the voltage of which is in phase opposition to the voltage of said first-mentioned source, a reference circuit connected with said auxiliary source, a reference condenser of variable capacity and substantially free of losses connected in said reference circuit, means for balancing the magnitudes of the voltages of said two circuits, said two circuits having a common branch, a rectifier arrangement of the bridge type connected in said common branch, a direct current measuring instrument disposed in the bridge of said arrangement, the rectifiers of said arrangement consisting of separately actuated commutators, means for actuating said commutators synchronously with the aforesaid voltages and in two timely succeeding groups of 180° phase displacement against each other, the commutators within each of said two groups being arranged to simultaneously close the connection of said instrument with said common branch, whereby said instrument indicates the loss angle of the condenser to be tested.

6. In a system for measuring the loss angle of a condenser, an alternating current source, a testing circuit connected with said source and designed to include the condenser to be tested, a transformer having two secondary windings and having its primary winding connected with said source, a reference circuit connected with one of said secondary windings, means for varying the magnitude of the voltage of said reference circuit in order to balance the magnitudes of the voltages in said two circuits, a practically loss-free condenser of variable capacity connected in said reference circuit, said two circuits having a common branch, a rectifier arrangement of the bridge type connected in said common branch, a direct current measuring instrument disposed in the bridge of said arrangement, the rectifiers of said arrangement consisting of separately actuated commutators, a magnetic actuating device for each commutator, the second secondary winding of said transformer being connected with said devices for actuating said commutators synchronously with the aforesaid voltages, the connections of the actuating devices with said second secondary winding being disposed to actuate said commutators in two timely succeeding groups of 180° phase displacement against each other, the commutators within each of said two groups being arranged to simultaneously close the connection of said instrument with said common branch, whereby said instrument indicates the loss angle of the condenser to be tested.

7. In a system for measuring a component of an alternating current, an alternating current source, a testing circuit connected with said source and designed to lead the testing current, a component of which is to be measured, an auxiliary source of a synchronous current in phase opposition to the component not to be measured of the testing current, a reference circuit connected with said auxiliary source, said testing circuit and said reference circuit having a common branch, a direct current measuring instrument disposed in said common branch to be traversed by the currents flowing in said two circuits, two groups of separately actuated phase-controlled rectifiers arranged in said common branch, one group being disposed to periodically close the connection of said direct current instrument with said common branch in phase with the auxiliary current of said reference circuit, the other group being disposed to periodically close the connection of said instrument with said common branch in phase opposition to said other rectifiers, means for balancing the magnitude of the component not to be measured of the test current and the magnitude of the corresponding component of said reference current, whereby the component not to be measured is compensated in magnitude and phase within said common branch containing said instrument and only the component to be measured is directly indicated by said instrument.

8. In a system for measuring the loss angle of a condenser, an alternating current source, a test circuit connected to said source and designed to include the condenser to be tested, a source of a synchronous auxiliary voltage of 180° phase displacement against the voltage of said test circuit, a reference circuit connected with said auxiliary source, a practically loss-free reference condenser of variable capacity disposed in said reference circuit, said test circuit and said reference circuit being connected to form a common branch, a direct current measuring instrument connected in said common branch, an arrangement of phase controllable rectifiers for periodically connecting said instrument with said common branch, means for phase controlling said rectifiers in synchronism with said voltages, said means being designed to close the rectifier circuits connecting said instrument with said common branch during two periods of 180° phase difference, one of which is in phase with said auxiliary voltage, and means for balancing the magnitudes of the voltages of the test circuit and of the reference circuit, whereby the component of the test current not to be measured may be compensated in magnitude and phase, and the loss angle of the condenser to be tested is indicated by said instrument.

WILHELM THAL.